United States Patent
Kobayashi et al.

(10) Patent No.: US 6,223,118 B1
(45) Date of Patent: Apr. 24, 2001

(54) VEHICLE DECELERATION CONTROL UNIT

(75) Inventors: Kouji Kobayashi; Kenji Itou; Nobuaki Miki; Shigeo Tsuzuki; Seiji Sakakibara; Kiyoshi Kurita; Yoshinori Matsushita; Masao Kawai, all of Anjo; Toshihiro Shimado, Tokyo, all of (JP)

(73) Assignees: Kabushiki Kaisha Equos Research, Anjo; Aisin AW Co., Ltd., Tokyo, both of (JP)

(*) Notice: Subject to any disclaimer, the term of this patent is extended or adjusted under 35 U.S.C. 154(b) by 0 days.

(21) Appl. No.: 09/310,743

(22) Filed: May 13, 1999

(30) Foreign Application Priority Data

May 15, 1998 (JP) .................................. 10-152061

(51) Int. Cl.$^7$ ............................ B60K 41/00; B60K 41/04
(52) U.S. Cl. .................................. 701/96; 701/54; 701/65
(58) Field of Search ............................ 701/96, 93, 65, 701/54; 342/70, 71, 72; 340/903; 477/47

(56) References Cited

U.S. PATENT DOCUMENTS

| 4,936,403 | * | 6/1990 | Morimoto | 180/176 |
|---|---|---|---|---|
| 5,033,571 | * | 7/1991 | Morimoto | 180/176 |
| 5,053,979 | * | 10/1991 | Etoh | 364/528.39 |
| 5,396,426 | * | 3/1995 | Hibino et al. | 701/96 |
| 5,832,400 | * | 11/1998 | Takahashi et al. | 701/53 |
| 5,901,806 | * | 5/1999 | Takahashi | 180/170 |
| 5,902,345 | * | 5/1999 | Minowa et al. | 701/96 |
| 5,959,572 | * | 9/1999 | Higashimata et al. | 342/70 |
| 6,058,347 | * | 5/2000 | Yamamura et al. | 701/96 |
| 6,059,686 | * | 5/2000 | Takahashi | 477/47 |

FOREIGN PATENT DOCUMENTS

| 64-69849 | | 3/1989 | (JP) . |
|---|---|---|---|
| 7-40758 | * | 2/1995 | (JP) . |
| 11-115545 | * | 4/1999 | (JP) . |

* cited by examiner

Primary Examiner—Michael J. Zanelli
(74) Attorney, Agent, or Firm—Oliff & Berridge, PLC

(57) ABSTRACT

A vehicle control unit controls a vehicle having a device capable of controlling deceleration, such as a continuously variable transmission. An information detection device is capable of determining a relationship between the instant vehicle and a preceding vehicle running in front of the instant vehicle, for example, a headway distance and a relative speed therebetween. Based on the information derived from the detection device, the vehicle correlation is determined and compared with a predetermined target correlation. Then, deceleration of the instant vehicle is set by a deceleration setting device such that the determined correlation reaches the predetermined target correlation. The device for performing deceleration is controlled based on the deceleration that has been set.

13 Claims, 14 Drawing Sheets

VEHICLE DECELERATION CONTROL UNIT

BACKGROUND OF THE INVENTION

1. Field of the Invention

The invention relates to a technology for controlling a vehicle, and more particularly, to the technology for controlling the vehicle in correlation with the vehicle driving in front thereof.

2. Description of the Related Art

There has been a technology disclosed in, for example, Japanese Patent Application Laid-Open No. Sho 64-69849, that is intended to support the safe driving for the driver by controlling various components of a vehicle running on the road (hereinafter referred to as a vehicle) in accordance with a distance (hereinafter referred to as a headway distance) between the vehicle and the vehicle driving in front thereof (hereinafter referred to as a preceding vehicle). In this technology, if the conditions, such as the headway distance that has been measured or the state where the vehicle is approaching the preceding vehicle, satisfy an appropriate predetermined condition, that is, the vehicle is fast approaching close to the preceding vehicle, the aforementioned technology executes a downshift of the transmission such that the braking force resulting from the engine brake is increased. In this case, the gear ratio of the transmission is controlled such that a target revolution is obtained by adding a coefficient (the difference in the revolutions between vehicles) to a reference revolution derived from an ordinary map.

The aforementioned conventional art controls the gear ratio of the transmission based on the uniquely established revolution irrespective of correlation between the vehicle and the preceding vehicle. Therefore, the resultant driving state of the vehicle is unstable, which may bother the driver of the vehicle by imparting an uncomfortable feeling, interfere with the driver with driving with the traffic flow, and have other unsatisfactory effects.

SUMMARY OF THE INVENTION

In consideration of the foregoing problems of the conventional art, it is an object of the invention to provide a vehicle control unit that sets the deceleration of the vehicle in correlation with the preceding vehicle, and controls the respective components of the vehicle in accordance with the set deceleration. As a result, the driver of the vehicle is allowed to run the vehicle smoothly to follow up the preceding vehicle only by operating an accelerator pedal.

In order to achieve the aforementioned object, the invention provides a vehicle control unit for controlling a vehicle employing a device capable of controlling deceleration and information detection means capable of determining a correlation between the vehicle and a preceding vehicle based on the correlation. The vehicle control unit includes deceleration setting means for determining a correlation between the vehicle and the preceding vehicle based on information derived from the information detection means, comparing the correlation with a predetermined target correlation, and setting a deceleration of the vehicle so as to reach the target correlation; and deceleration control means for controlling a device that performs deceleration of a vehicle based on the set deceleration.

In the aforementioned vehicle control unit, the deceleration setting means sets the deceleration that is continuously updated from the start of control to the establishment of the target correlation and a value of the deceleration is reduced as it approaches the target correlation.

In the aforementioned vehicle control unit, the deceleration is set to reduce a deceleration rate as it approaches the target correlation.

In the aforementioned vehicle control unit, the information that allows the determination of the correlation contains a headway distance between the vehicle and the preceding vehicle and a speed of the vehicle approaching the preceding vehicle; the target correlation contains a reference headway distance; and the deceleration is calculated at least based on the approaching speed of the vehicle so as to become zero or less at a time when reaching the reference headway distance.

In the aforementioned vehicle control unit, the information that allows the determination of the correlation contains a headway distance between the vehicle and the preceding vehicle and a speed of the vehicle approaching the preceding vehicle; the target correlation contains a reference headway distance; and the deceleration is obtained by referring to a map at least based on the approaching speed of the vehicle so as to become zero or less at a time when reaching the reference headway distance.

In the aforementioned vehicle control unit, the vehicle employs means for detecting a vehicle speed and means for detecting an operating speed of an accelerator pedal; and the reference headway distance is set in accordance with the speed of the vehicle and varied in accordance with the speed at which the accelerator pedal is released.

In the aforementioned vehicle control unit, the vehicle employs means for detecting a vehicle speed and means for detecting an operating speed of an accelerator pedal; and the reference headway distance is set to the headway distance established at a time when the accelerator pedal is released and varied in accordance with the speed at which the accelerator pedal is released.

In the aforementioned vehicle control unit, the vehicle employs road condition detection means for detecting a road condition; and the deceleration is varied in accordance with the road condition detected by the road condition detection means.

In the aforementioned vehicle control unit, the road condition detection means is a navigation system, information of which is used to determine the road condition.

In the aforementioned vehicle control unit, the device capable of controlling the deceleration is a continuously variable transmission, the deceleration is set to a target value of the continuously variable transmission, and a deceleration of the continuously variable transmission is controlled to reach the target value.

In the structure of the vehicle control unit according to the first aspect of the invention, the respective components of the vehicle are controlled to achieve the deceleration that has been set in accordance with the correlation with the preceding vehicle. This structure makes it possible to execute the optimal vehicle control in accordance with the correlation between the vehicle and the preceding vehicle from the start to the end of control. Since the resultant driving state of the vehicle becomes stable, the driver is not bothered by the uncomfortable feeling and is allowed to run with the traffic flow.

In the structure according to the second aspect of the invention, the respective components of the vehicle are controlled based on the deceleration that has been set to reduce the vehicle speed continuously and gradually from the start of control to the establishment of the target correlation.

Further, in the structure according to the third aspect of the invention, the deceleration is set to be rapidly reduced upon the start of control and further reduced gently thereafter, which allows for the smooth establishment of the target correlation. Accordingly, the resultant control reflects the driver's intention quite well.

In the structure according to the fourth aspect of the invention, the deceleration is obtained by calculation based at least on the speed of the vehicle approaching the preceding vehicle such that the approaching speed at a timing when reaching the reference headway distance as the target correlation becomes equal to or less than zero. As a result, no map is required for setting the deceleration, thus reducing the required storage area in the control unit.

In the structure according to the fifth aspect of the invention, the deceleration is derived from a map based on at least the speed of the vehicle approaching the preceding vehicle such that the approaching speed is at a timing to reach the reference headway distance as the target correlation becomes equal to or less than zero, thus allowing for easy control.

In the structure according to the sixth aspect of the invention, the reference headway distance as the index of the target correlation is uniquely set from the map in accordance with the vehicle speed. In other words, the higher the vehicle speed becomes, the longer the reference headway distance is set. When the speed at which the accelerator pedal is released by a driver (hereinafter referred to as a release speed) becomes higher, it can be assumed that the driver demands greater deceleration. This may indicate that the driver feels that the present reference headway distance is too short. When the release speed becomes higher, the reference headway distance is increased and vice versa. In this way, the reference headway distance is varied in accordance with the speed at which the accelerator pedal is released by the driver, such that the control reflects the driver's intention quite well.

In the structure according to the seventh aspect of the invention, the reference headway distance as the index of the target correlation is set to the value of the headway distance established at a timing when the driver releases the accelerator pedal. That is, the reference headway distance is set to the value of the headway distance at the timing when the driver determines the necessity of deceleration. Accordingly, the vehicle sensitive cruise control that reflects the driver's intentions can be performed. The control that reflects the driver's intentions can be achieved by changing the reference headway distance in accordance with the release speed, that is, the reference headway distance is increased as the release speed increases and vice versa.

In the structure according to the eighth aspect of the invention, the deceleration under the control is set on the assumption that the subject vehicles are running on a flat straight road. The invention can be structured such that the deceleration may be varied in accordance with the road conditions. For example, as the vehicle is cornering or running on the downslope road and demands deceleration at a higher rate, the deceleration is changed to be greater than the usual deceleration. Meanwhile, a vehicle running on an upslope road or a road with a low coefficient of friction barely demands the deceleration at a higher rate. Thus, it is changed to be less than the usual deceleration. The vehicle sensitive cruise control reflected by the running environment of the vehicle can be performed by changing the deceleration in accordance with the road conditions.

In the structure according to the ninth aspect of the invention, the road condition is detected by a sensor when varying the deceleration in accordance with the road condition. Such a structure requires a plurality of sensors for detecting a corner, slope, traffic jam or other factors affecting traffic flow, respectively, thus greatly increasing the cost. Meanwhile a navigation system is capable of preliminarily storing data on the road conditions of the current location of the vehicle and the periphery thereof, for example, corner R, slope, traffic jam, branch, road width, and so forth in a recording medium such as a CD-ROM, or capable of receiving/transmitting the road information from/to the information center remote from the vehicle. A plurality of data, thus, can be detected by the navigation system. Accordingly, the road condition data detected by the navigation system can be used to vary the deceleration, which makes it possible to execute the vehicle sensitive cruise control reflected by the running environment of the vehicle exactly without greatly increasing the cost.

In the structure according to the tenth aspect of the invention, a target value of a continuously variable transmission is set in accordance with the deceleration so as to achieve the deceleration that has been set based on the correlation between vehicles. The deceleration ratio of the continuously variable transmission is controlled so as to be the target value. Therefore, the deceleration ratio control in accordance with the deceleration can be continuously performed, resulting in smooth vehicle sensitive cruise control compared with the control by a multi-stage transmission.

DETAILED DESCRIPTION OF THE PREFERRED EMBODIMENTS

Figure 1:
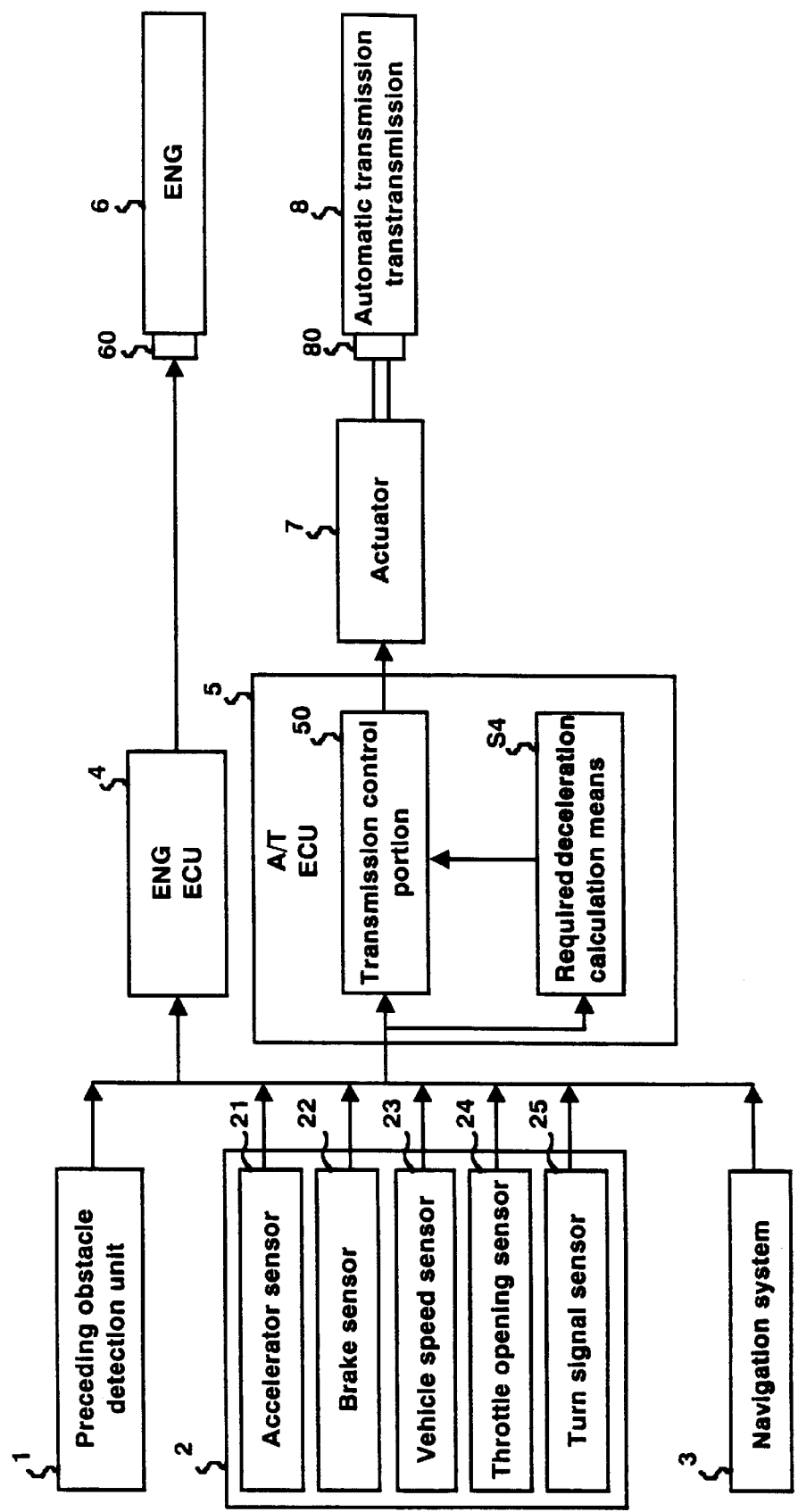
FIG. 1 is a block diagram representing a system structure of a vehicle control unit to which the invention has been applied.

An embodiment of the invention is described referring to the drawings. FIG. 1 is a block diagram showing a system structure of a vehicle control unit to which the invention has been applied. Referring to the outline of the structure of the mechanism, the vehicle to which the invention is applied employs devices capable of controlling operations relating to deceleration (the engine, motor generator, automatic transmission and so forth) and information detection means capable of determining the correlation between the vehicle and the preceding vehicle. The vehicle control unit of the invention has an input portion including a preceding obstacle detection unit 1 as the aforementioned information detection means, vehicle state detection unit 2, a navigation unit (navigation system) 3, and a control portion including an engine control unit (ENG-ECU) 4 and an automatic transmission control unit (A/T-ECU) 5. The control portion is designed to control the devices provided in the respective positions of the vehicle and capable of controlling operations relating to deceleration including an engine 6, that is, an actuator 7 for actuating those devices. The automatic transmission control unit 5 contains a transmission control portion 50 and required deceleration calculation means S4 therein. In this case, the required deceleration calculation means S4 is provided in the respective control units. However, it may be structured such that at least one unit of the required deceleration calculation means S4 may be positioned in the control unit so as to transmit the signal to the other control units.

Each of the respective devices will be described below. The preceding obstacle detection unit 1 of the input portion detects an obstacle that exists forward of the vehicle running on the road, for example, the vehicle running in front thereof, any existing or stopped vehicle or anything else positioned on the advancing path of the vehicle by measuring the time taken for a wave to reflect from the obstacle and frequency deflection caused by Doppler effect using an electric wave, ultrasound or a light lay. In some cases, the preceding obstacle detection unit 1 can also be structured to recognize and detect either a mark or a character painted on the road surface, such as a white lane marking, or a shape and color of the obstacle. In this embodiment, the preceding obstacle detection unit 1 constitutes a laser radar. However, it can be made up of, for example, a milli-meter wave radar, image recognition device, ultrasonic sensor as a single component, or any combination thereof. The invention is not dependent on the type detector used, only that it can accurately determine the range from the vehicle to the object in front of the vehicle.

The vehicle state detection unit 2 is made up of an accelerator sensor 21 for detecting an operation degree of an accelerator pedal performed by the driver, a brake sensor 22 for detecting an operation degree of a brake pedal, a vehicle speed sensor 23 for detecting a vehicle speed based on the output revolution of the automatic transmission, a throttle opening sensor 24 for detecting a throttle opening degree based on the operating state of the throttle valve of the engine or an operating signal therefor, and a turn signal sensor 25 for detecting the operation of the turn signal switch.

The navigation unit 3 is structured to store road state information, such as a corner R, slope, branch, and width of the road, preliminarily stored in a recording medium like a CD-ROM, such that the information on the present location of the vehicle, traffic jams and so forth can be detected through transmitting/receiving data to/from a facility, such as an information center, remote from the vehicle.

The engine control unit 4 of the control portion comprises an electronic control unit that controls the engine output by adjusting the respective actuators for controlling the throttle opening, fuel injection amount, and the like, based on the throttle opening, engine speed and other factors (coolant temperature, hydraulic temperature). Under the control of the invention, the aforementioned electronic control unit is designed to control such that the engine output is reduced by adjusting the respective actuators based on the value of the required deceleration supplied from the required deceleration judgment means (not shown).

The automatic transmission control unit 5 comprises an electronic control unit having a control program required to control an automatic transmission 8, which is recorded in a semiconductor memory. In the aforementioned structure, the gear is selected based on the throttle opening detected by the throttle opening sensor 24 and the vehicle speed detected by the vehicle speed sensor 23 by referring to a built-in memory table (a map of the target revolution). The map of the target revolution is used to determine the gear ratio of the automatic transmission 8 to be controlled.

Figure 2:
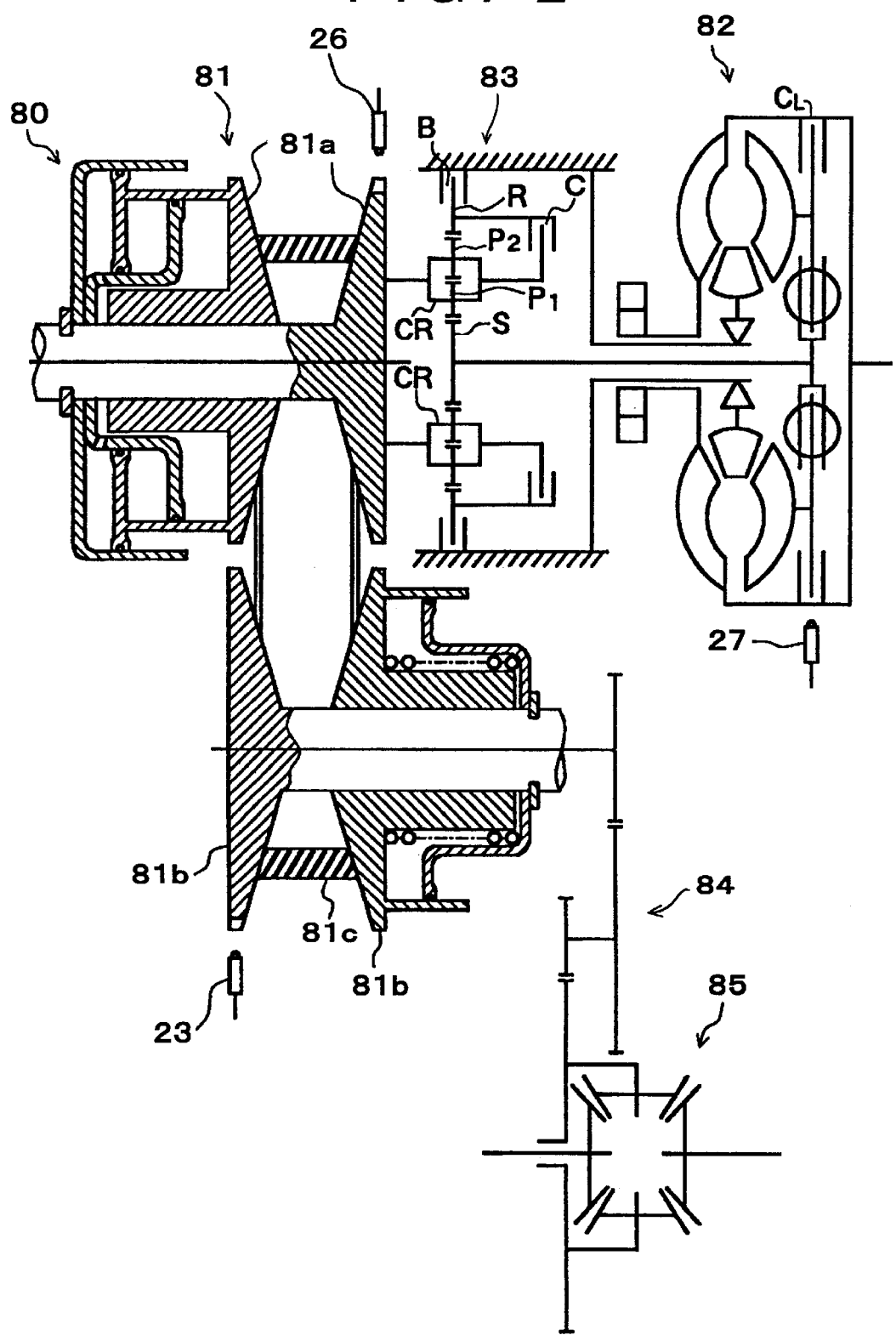
FIG. 2 is a skeleton diagram representing a structure of an automatic transmission controlled by the vehicle control unit.

Referring to FIG. 2, the unit subjected to the control of the automatic transmission control unit 5 is formed as the automatic transmission 8 having a continuously variable transmission (hereinafter referred to as CVT) 81 having a torque converter 82 as a clutch. At an input side of the CVT 81, there is the torque converter 82 having a lock-up clutch $C_L$ for inputting revolutions of an engine 6 and a reverse mechanism 83 constituting a planetary gear drive having dual pinions $P_1$, $P_2$ for transmitting forward revolution by direct engagement with a clutch C and reverse revolution by engaging a ring gear R through engagement of a brake B in relation with the input of a sun gear S and the input/output of a carrier CR output. The CVT 81 is provided with a primary pulley 81a for inputting the revolution of the reverse mechanism 83, a secondary pulley 81b for outputting the transmission revolution, a belt 81c for power transmission to both pulleys, and a hydraulic circuit (not shown) for setting the gear change ratio by changing the width of each groove of the pulleys 81a, 81b. An output side of the CVT 81 is connected to a differential gear 85 for transmitting the output of the CVT 81 to the vehicle wheel via a counter gear 84 that also performs deceleration. The gear ratio is changed upon the hydraulic circuit operation in accordance with the driving signal applied to an actuator 7 (specifically, a solenoid as a driving portion of a solenoid valve) incorporated into the hydraulic circuit that operates a hydraulic servo 80. The revolution load of the engine 6 generated by driving the wheel in a coasting state is used as the braking force for deceleration. Accordingly, the CVT 81 functions as the device that can control the operation relating to deceleration. Referring to FIG. 2, reference numeral 23 designates a vehicle speed sensor, reference numeral 26 designates an input revolution sensor and a reference numeral 27 designates an engine speed sensor, which are not shown in FIG. 1. In the case where the aforementioned unit constitutes a multi-stage transmission, the friction engagement element that achieves a predetermined gear is engaged instead of changing each groove width of the pulleys such that the similar braking force can be obtained. Likewise the actuator to be controlled constitutes the solenoid of the solenoid valve incorporated into the hydraulic circuit.

Figure 3:
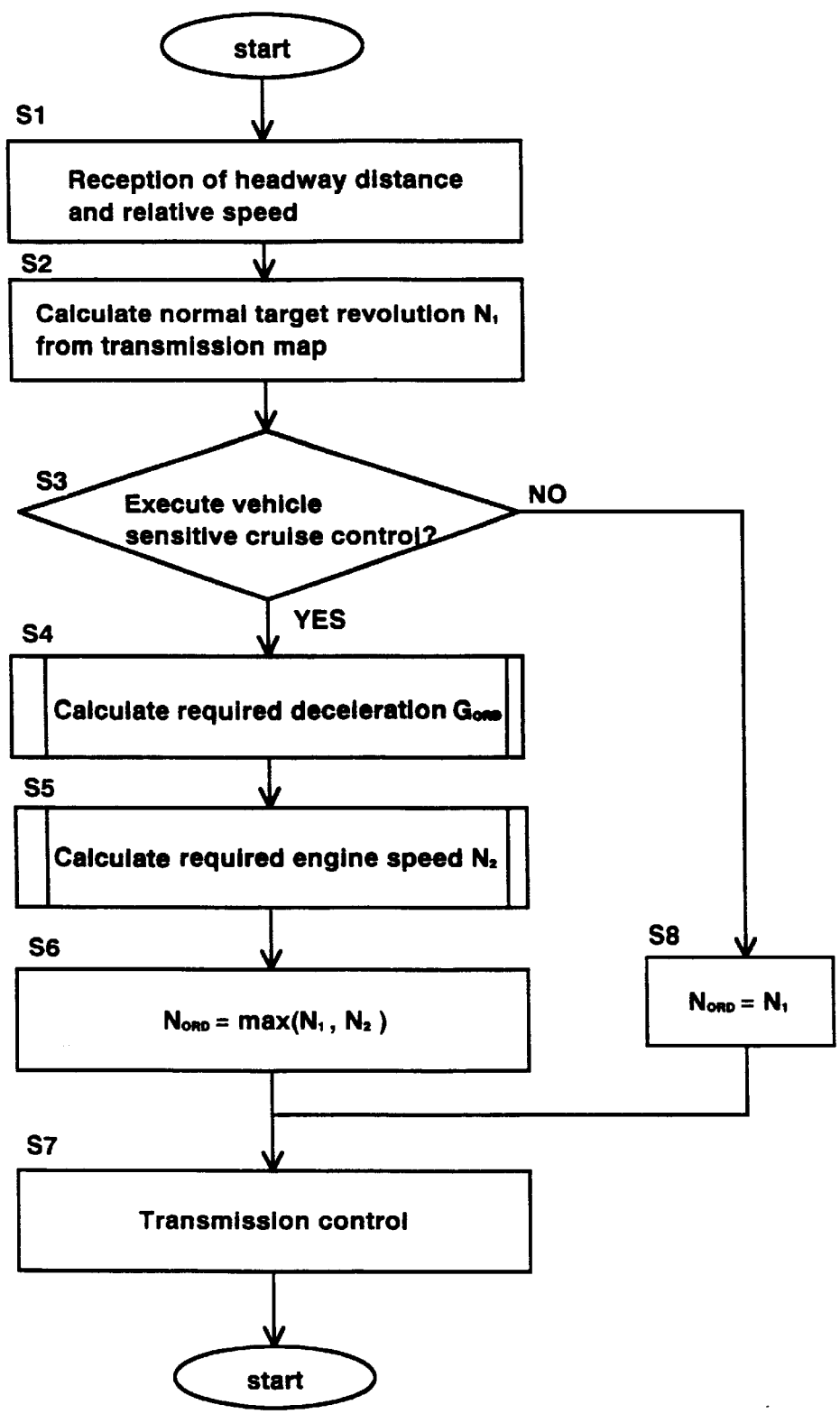
FIG. 3 is a flowchart representing a main flow of a vehicle sensitive cruise control executed by the vehicle control unit.

FIG. 3 shows a main flow of the control executed by the above-structured vehicle control unit. In step S1 of the main flow, data of the headway distance and relative speed are received from the preceding obstacle detection unit 1. The headway distance can be derived from the following equation:

Headway distance $L = \Delta t \times C/2$ ($C$: velocity of light)

where the time taken for the laser pulse from radiation to return is defined as $\Delta t$.

The relative speed can be derived from the following equation with respect to the varied amount $\Delta L$ of the headway distance L between one cycle and another:

Relative speed $V_{CM} = \Delta L / \Delta T$ where the cycle for measuring the headway distance L is defined as $\Delta T$.

Figure 4:
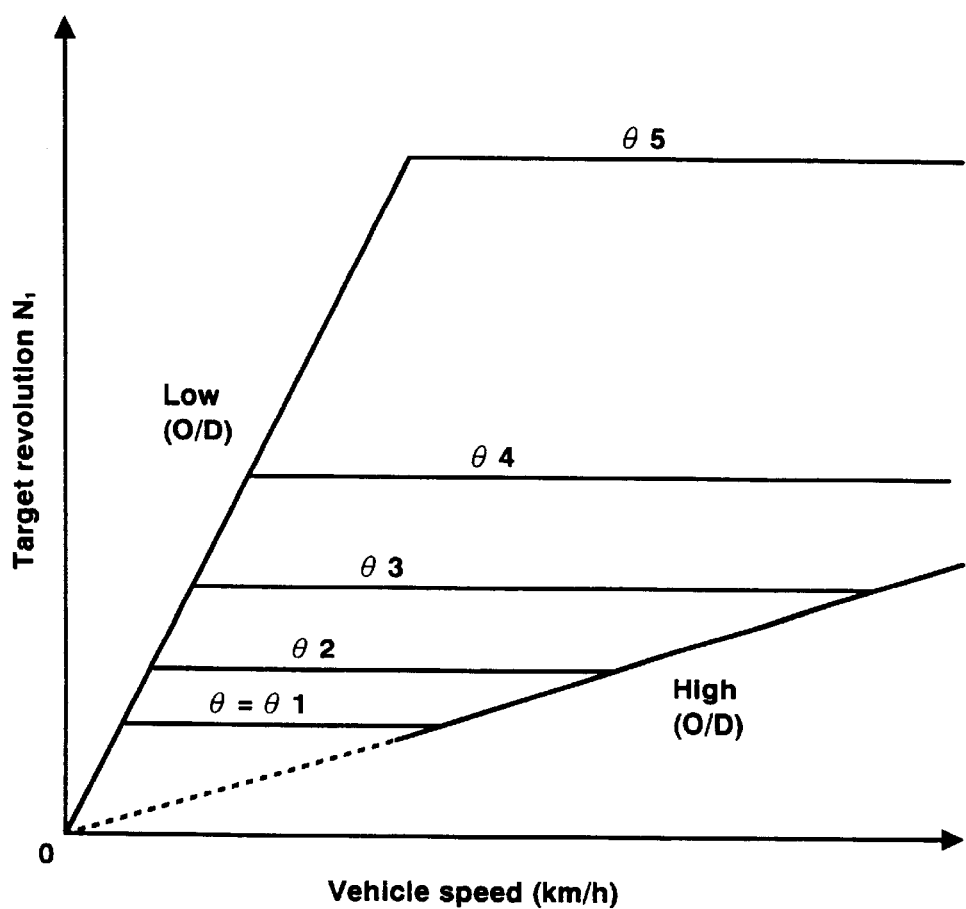
FIG. 4 is a graph conceptually representing a vehicle speed map of the control unit.

Next in step S2, a normal target revolution $N_1$ is calculated by referring to the vehicle speed map recorded in the vehicle transmission control unit 5. FIG. 4 shows a graph conceptually representing the vehicle speed map. The target revolution $N_1$ is defined relative to the vehicle speed with the parameter of the depression amount θ of the accelerator pedal detected by the accelerator sensor 21. Specifically, both at the lower limit (Lo) and the higher limit (High) of the gear ratio, the target revolution $N_1$ is proportional to the vehicle speed. Meanwhile in the range between the lower limit (Lo) and the higher limit (High), the gear ratio is changed in accordance with the depression amount θ (θ1–θ5) of the accelerator pedal irrespective of the vehicle speed so as to maintain the target revolution $N_1$ constant.

Next in step S3, it is determined whether or not a vehicle sensitive cruise control is executed. The determination becomes Yes, that is, the control is started only when satisfying all the conditions, for example, the depression amount θ of the accelerator pedal becomes zero (the factor reflecting the requirement of the driver for deceleration); the headway distance L based on the information detected by the preceding obstacle detection unit 1 is less than a predetermined value $L_1$ (the factor requiring no control when the headway distance is too long); the value of the relative speed becomes positive indicating the vehicle is approaching the obstacle (the factor indicating that the vehicle is approaching the preceding vehicle); and the vehicle speed (SPEED) exceeds 20 km/h (the factor preventing the vehicle at a low speed in the traffic jam from being apart too far from the preceding vehicle). The condition for terminating the control will be described later. If the determination in step S3 is No, a target revolution $N_{ORD}$ used for the transmission control of the CVT 81 is calculated by referring to the vehicle speed map in step S8 (See FIG. 4). Then the resultant target revolution $N_{ORD}$ is set to the normal target revolution $N_1$ for return to the next loop.

Figure 5:
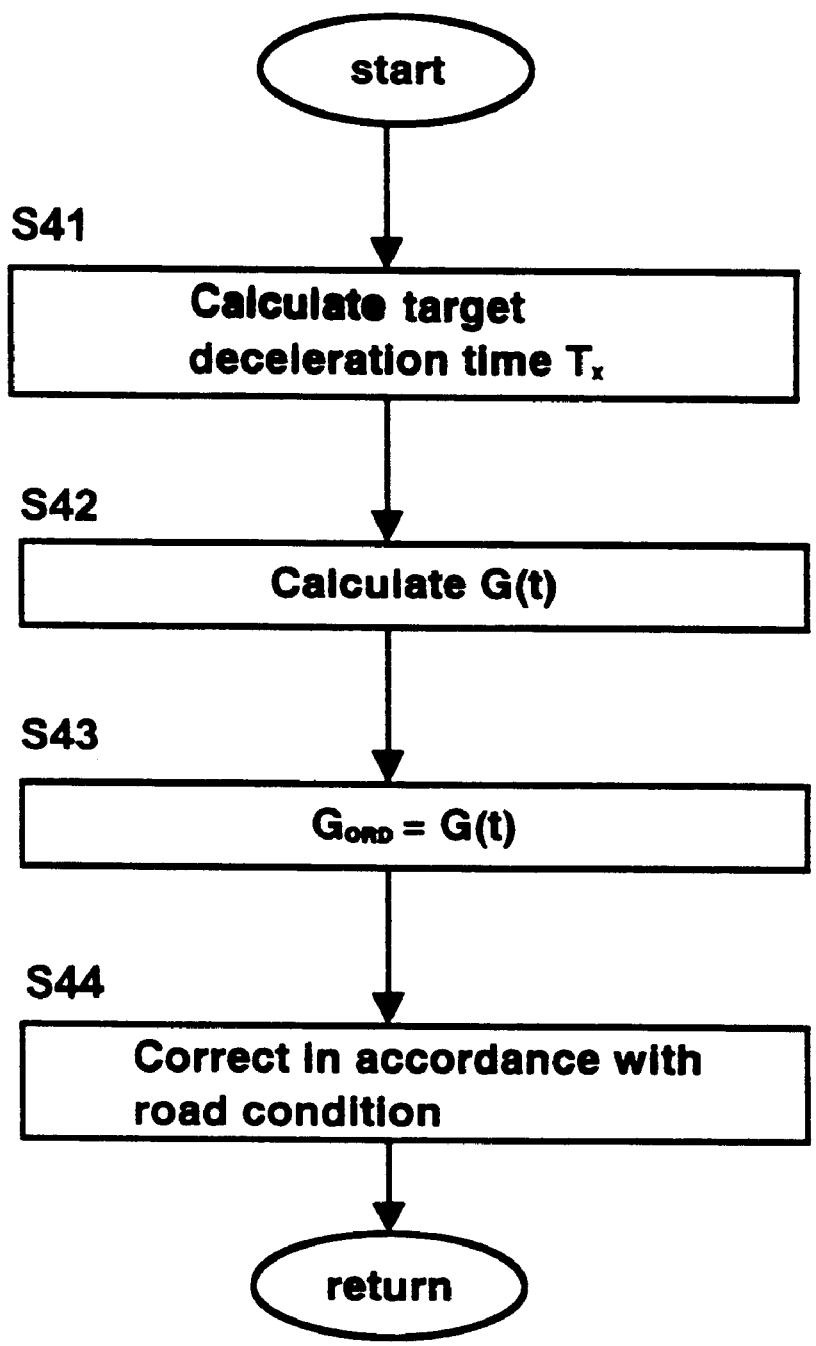
FIG. 5 is a flowchart representing an example of a subroutine for calculating a required deceleration of the vehicle sensitive cruise control.

If the conditions for starting the control are satisfied and the determination in step S3 is Yes to start the vehicle sensitive cruise control, the process proceeds to step S4 where the required deceleration $G_{ORD}$ at this time is calculated. FIG. 5 shows one embodiment representing a subroutine for calculating the required deceleration $G_{ORD}$. The required deceleration $G_{ORD}$ is set for the purpose of control such that, basically, the relative speed at a time when the deceleration time Tx has elapsed from the start of the control is zero, and the headway distance is equal to a reference headway distance L(m). However, if the headway distance is already less than the reference headway distance L(m) at the start of the control, the deceleration control is not sufficient to set the relative speed to zero while increasing the headway distance. Therefore, the step for calculating the required deceleration $G_{ORD}$ is branched into two different processes based on the respective conditions.

FIGS. 6A–6D specifically show how the required deceleration $G_{ORD}$ is calculated when the headway distance $l_0$ at the start of control is greater than the reference headway distance L(m). It is a basic concept of the aforementioned calculation that the required deceleration $G_{ORD}$ is set as a function of the time G(t) such that the deceleration becomes zero after the elapse of the time Tx in accordance with a predetermined characteristic with respect to the elapsed time t as shown in a FIG. 6A. That is, the following equation is obtained:

$G(t) = ate^{-bt}$ ($a$, $b$=unknown quantity).

Figure 6A:
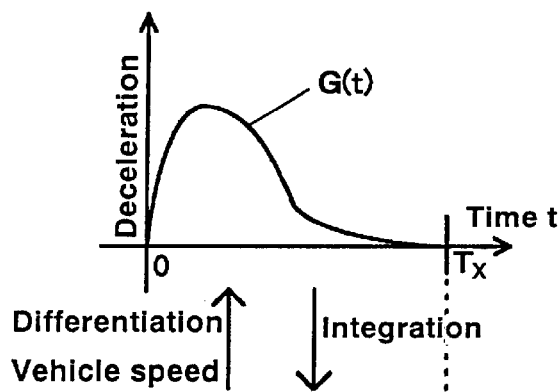
FIGS. 6A–6E are graphical representations that show how the required deceleration $G_{ORD}$ is calculated when the headway distance $l_0$ at the start of control is greater than the reference headway distance L.
Figure 6E:
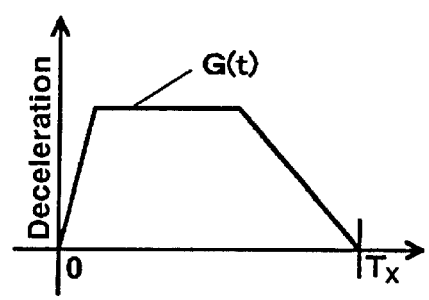
Figure 6B:
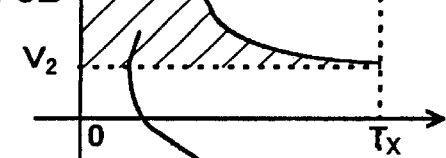
Figure 6C:
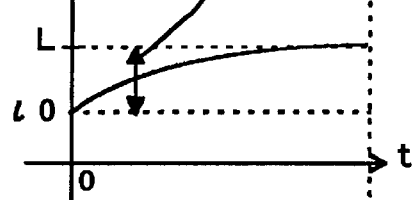
Figure 6D:
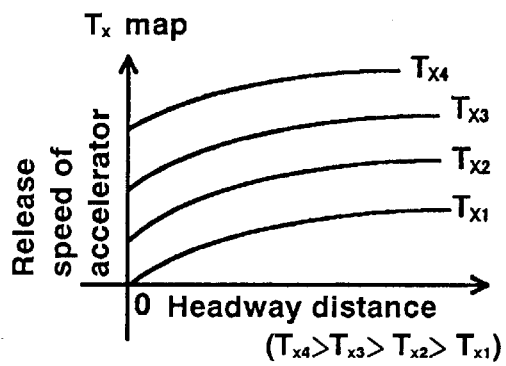

The time Tx is derived from a map, as shown in FIG. 6D which is established in the correlation between the headway distance and the release speed. At the elapse of the time Tx from the start of control, each of the unknown quantities a, b is determined such that the following relationship are established:

Vehicle speed $V_1(t)$ of the vehicle=Vehicle speed $V_2$ of the preceding vehicle;

Headway distance l=Reference headway distance L.

The required deceleration G(t) may be set to a function that linearly varies as shown in FIG. 6E. Accordingly, the vehicle speed $V_1(t)$ governed by the required deceleration G(t) varies as shown in of FIG. 6B. The vehicle speed $V_1(t)$ is derived from the following equation by integrating the required deceleration G(t).

$$V_1(t) = -(a/b)\{t+(1/b)\}e^{-bt} + c; \text{ (c=unknown quantity)} \qquad \text{Eq. 1}$$

Assuming that the headway distance at the start of control is set as $l_0$, the headway distance varies by the amount $L-l_0$ as shown in FIG. 6C. The varied amount is equivalent to the area of the section defined by diagonal lines shown in FIG. 6B. As a result, the following equation is established.

$$L - l_0 = \int_0^{Tx} V_1(t)dt - V_2 Tx$$

($l_0$: headway distance at the start of control).

The unknown quantities a, b, c are determined by providing the following boundary conditions:

$V_1(0) = V_1$;

$V_1(Tx) = V_2$.

The resultant required deceleration G(t) is set as the required deceleration $G_{ORD}$ at each timing as represented by the following equation:

$$G_{ORD} = G(t)$$

Meanwhile if the headway distance $l_0$ at the start of control is less than the reference headway distance L, it is controlled to establish the relationship $V_1(t) = V_2$ at the elapse of the time Ty from the start of control and further to establish the relation $V_1(t) = V_1'$ at the elapse of the time Tx. The map of the time Tx defined by the correlation between the headway distance and the release speed is different from that shown by the map shown in FIG. 6D. In this case, the following three equations are used in place of the equation 1:

$V_1(0) = V_1$;

$V_1(Ty) = V_2$ (Ty=constant);

$V_1(Tx) = V_1'$.

The $V_1'$ is set to the value slightly less than that of $V_2$ by a few percent thereof for increasing the headway distance. The constants Ty and $V_1'$ may be set by referring to the map.

In initial step S41 of the subroutine shown in FIG. 5, a target deceleration time Tx is calculated. Next in step S42, the required deceleration G(t) is calculated, and further in step S43, the required deceleration $G_{ODR}$ at this timing is set to the required deceleration G(t) that has been calculated at the preceding step.

Figure 7:
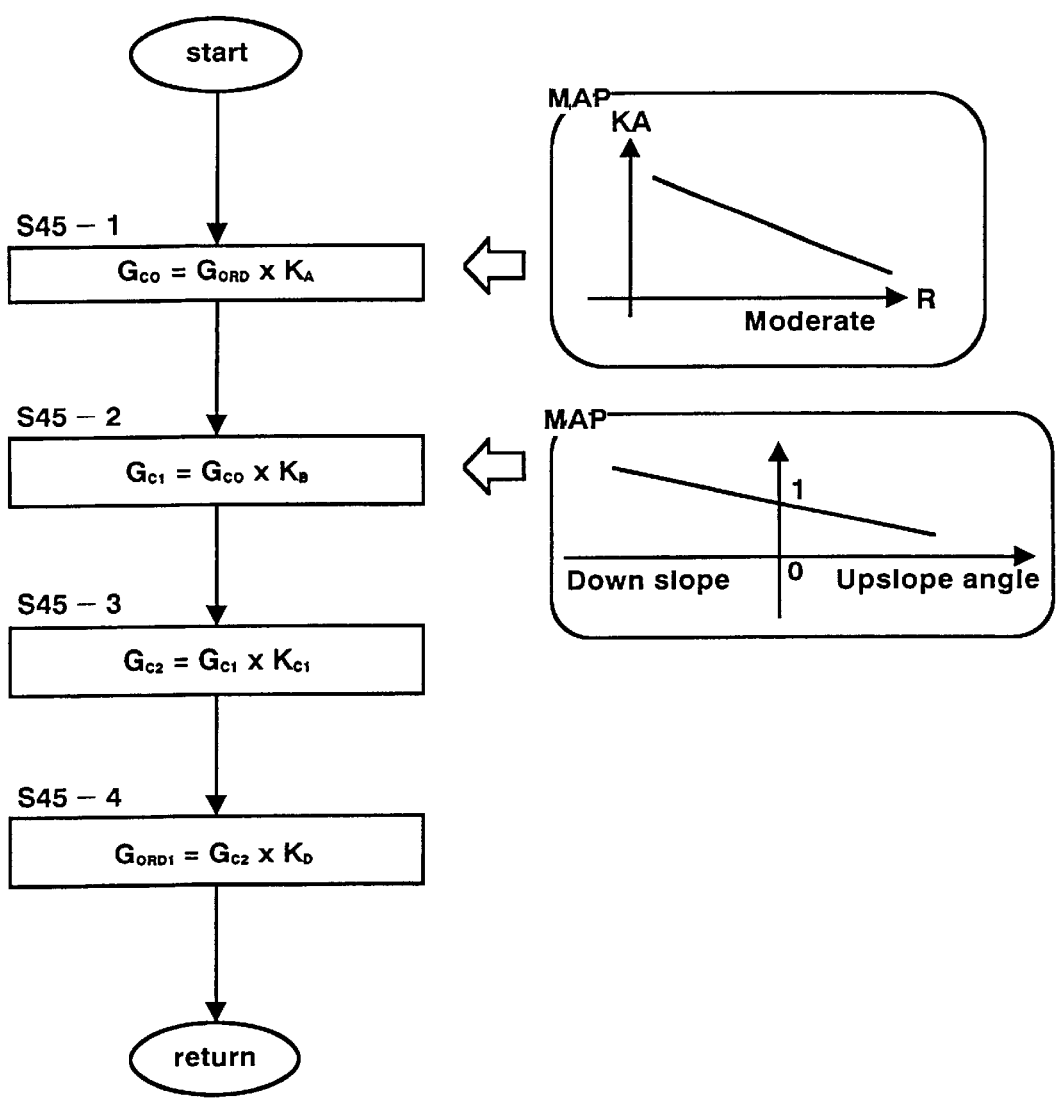
FIG. 7 is an example of a specific method for calculating the required deceleration obtained by the calculation in the control.

Finally in step S44, the correction is executed in accordance with the road condition. More specifically, referring to a subroutine flow as shown in FIG. 7, a correction value $G_{CO}$ is obtained by correcting the required deceleration $G_{ORD}$ using a constant $K_A$ that has been mapped in consideration of the corner R in step S45-1. Then in step S45-2, a secondary correction value $G_{c1}$ is obtained by correcting the corrected value $G_{co}$ using a constant $K_B$ that has been mapped in consideration of the upslope/downslope angles. Further in step S45-3, a tertiary correction value $G_{c2}$ is obtained by correcting the secondary correction value $G_{c1}$ using a constant $K_{c1}$ in consideration of the information of the navigation unit (corner R, slope, traffic jam, branch, road width and so forth). Finally in step S45-4, a final correction value $G_{ORD1}$ is obtained by correcting the tertiary correction value $G_{c2}$ using a constant $K_D$ in consideration of a road with a low coefficient of friction. Other types of correction, for example, through switch-on of a turn signal detected by the turn signal sensor 25 can be added to the aforementioned corrections.

Figure 8:
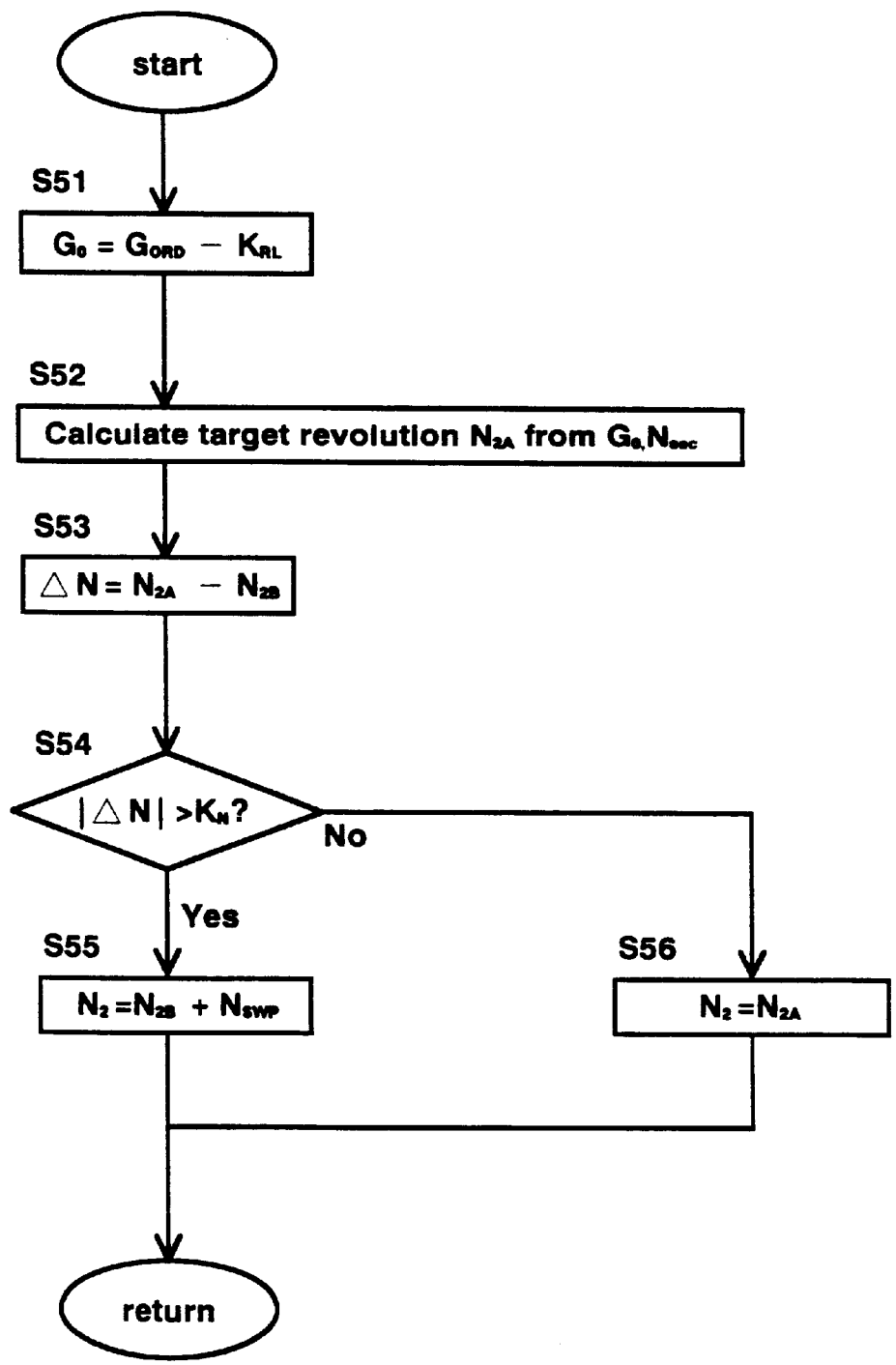
FIG. 8 is a flowchart of a subroutine for calculating the required engine speed in the control.

Back to the main flow shown in FIG. 3, in next step S5, the required engine speed $N_2$ is calculated. The flow of a subroutine for calculating the required engine speed $N_2$ is shown in FIG. 8. In step S51 of the flow in FIG. 8, a correction demanding deceleration $G_0$ is calculated by subtracting the amount corresponding to the running resistance including the air resistance, rolling resistance and the like from the preliminarily obtained required deceleration $G_{ORD}$. In this case, the deceleration value $K_{RL}$ denotes the deceleration corresponding to the running resistance. This value is mapped to be recorded in a memory of the automatic transmission control unit 5. Next in step S52, a target revolution $N_{2A}$ is derived from the correction demanding deceleration $G_0$ that has been preliminarily obtained and the revolution $N_{sec}$ of the secondary pulley 81b of the CVT 81.

Specifically, the target revolution $N_{2A}$ will be obtained in the following manner. The correlation between the engine torque $T_e$ and the output torque $T_{out}$ (the output torque converted into the torque of the secondary pulley 81b) is represented by the following equation:

$$T_e \times i_p = T_{out} \ (i_p: \text{pulley ratio})$$

The above equation can be replaced as follows:

$$T_e \times (N_{pri}/N_{sec}) = G \times M$$

where $N_{pri}$ denotes the revolution of the primary pulley 81a detected by the input revolution sensor 26, $N_{sec}$ denotes the revolution of the secondary pulley 81b detected by the vehicle speed sensor 23, G denotes the vehicle acceleration converted into the acceleration of the secondary pulley 81b, and M denotes the vehicle weight. If the lockup clutch of the torque converter 82 is in an engaged state, the primary revolution $N_{pri}$ is equal to the engine speed $N_e$. Accordingly, the following equation is established:

$$T_e \times (N_e/N_{sec}) = G_{ORD} \times M.$$

Therefore, the following equation is further established:

$$T_e \times N_e = N_{sec} \times G_{ORD} \times M.$$

Figure 9:
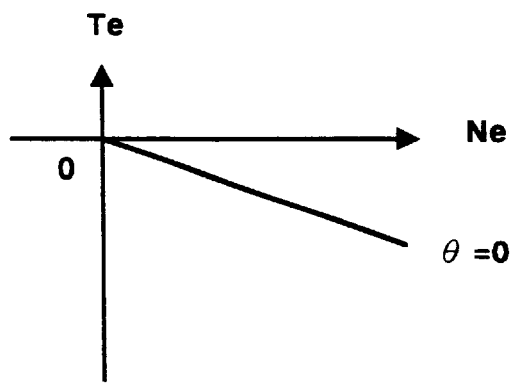
FIG. 9 is a graph conceptually representing the engine characteristics map used for the control.
Figure 10:
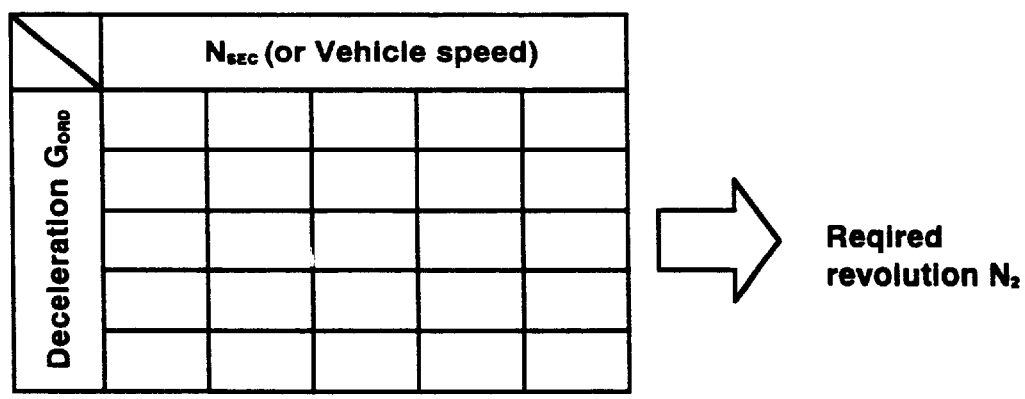
FIG. 10 is a map of the required revolution in the control.

As the value derived from the right side of the above equation is known, the engine speed $N_e$ that satisfies the above relation is obtained by referring to the engine characteristics map shown in FIG. 9. Then the obtained result is set to $N_{2A}$.

Alternatively the target revolution $N_{2A}$ can be obtained by using a map that has been previously created. In this case, the table that directly defines the required revolution $N_2$ with respect to the required deceleration $G_{ORD}$ and the secondary revolution $N_{sec}$ (or vehicle speed) is preliminarily recorded in the memory of the automatic transmission control unit 5.

Based on the thus obtained target revolution $N_{2A}$, in step S53 shown in FIG. 8, a varied revolution N is calculated by subtracting the target revolution $N_{2B}$ that has been similarly obtained at the preceding cycle from the target revolution $N_{2A}$. Next in step S54, it is determined whether the absolute value of the varied revolution ΔN is greater than a threshold value $K_N$ so as to determine if the smoothing operation is required. If No, that is, the varied revolution ΔN is equal to or less than the threshold value, the process proceeds to step S56 where the target revolution $N_{2A}$ is kept unchanged and set to the target revolution $N_2$, and it is returned. If Yes in step S54, the process proceeds to step S55 where a smoothing value $N_{SWP}$ is further added to the target revolution $N_{2B}$. If the varied revolution N is greater than zero, i.e., ΔN>0, the constant is set to establish the relationship of the smoothing value $N_{SWP}$<0. If the varied revolution ΔN is less than zero, i.e., ΔN<0, the constant is set to establish the relationship of the smoothing value $N_{SWP}$>0. The smoothing value $N_{SWP}$ may be mapped in accordance with the magnitude of the varied revolution ΔN.

Referring back to FIG. 3, in step S6, a target revolution $N_{ORD}$ as the final value used for transmission control of the CVT 81 is calculated by referring to the vehicle speed map in step S2. Then the normal target revolution $N_1$ is compared with the required engine speed calculated in the preceding step S5, and whichever value of the two values is greater is set to the target revolution $N_{ORD}$. Then in step S7, the transmission control is executed. In this way, the control is continued until the control termination condition is satisfied. The conditions for terminating control are when the accelerator is in the ON state, or a vehicle speed (SPEED) is equal to or less than 20 km/h, or the headway distance exceeds a second predetermined value $L_2$ and further the required engine speed $N_2$ is less than the normal target revolution $N_1$.

The following are several embodiments for obtaining the reference headway distance L(m) as the important element for calculating the required deceleration $G_{ORD}$ under control in accordance with the invention.

Figure 11:
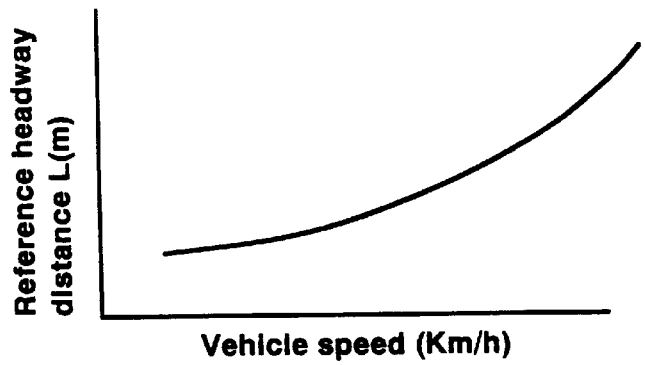
FIG. 11 is a graph conceptually representing the map of the reference headway distance in the control.

FIG. 11 shows a first embodiment representing how the reference headway distance L(m) is defined. This is the easiest way to obtain the reference headway distance L(m), by referring to the map. As shown by the curve of secondary degree, the reference headway distance L(m) is uniquely set such that the increase rate gradually becomes greater as the vehicle speed increases.

Figure 12:
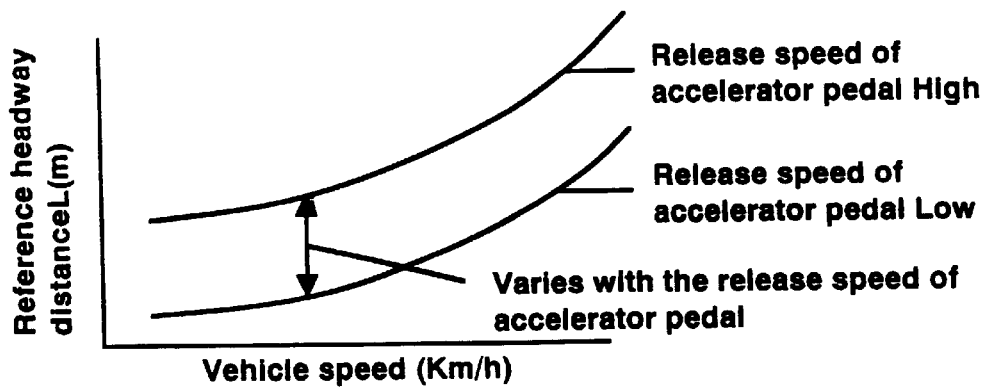
FIG. 12 is a graph conceptually representing the other example of the reference headway distance.

In the method of the second embodiment of the invention shown in FIG. 12, the reference headway distance L(m) is defined by the vehicle speed and the speed at which the accelerator pedal is released by the driver. If the driver releases the accelerator pedal slowly in anticipation of moderate deceleration, the deceleration is gently performed in the state where the reference headway distance L(m) is shorter, resulting in the moderate deceleration. On the contrary, if the driver releases the accelerator pedal quickly in anticipation of sharp deceleration, the deceleration is quickly performed in the state where the reference headway distance L(m) is longer, resulting in the sharp deceleration.

In the method of the third embodiment of the invention, the headway distance at a time when the operator releases the accelerator pedal is defined as a basic headway distance L, and the reference headway distance L(m) is adjusted in accordance with the release speed. This can be represented by the following equation:

> Reference headway distance L(m)=headway distance L at a time when the accelerator pedal is released+correction value in accordance with the release speed.

In this case, the correction value in accordance with the release speed is set to zero if it is less than a predetermined value. On the contrary, if it is greater than the predetermined value, the correction value becomes a positive value which increases as the speed is raised.

Figure 13:
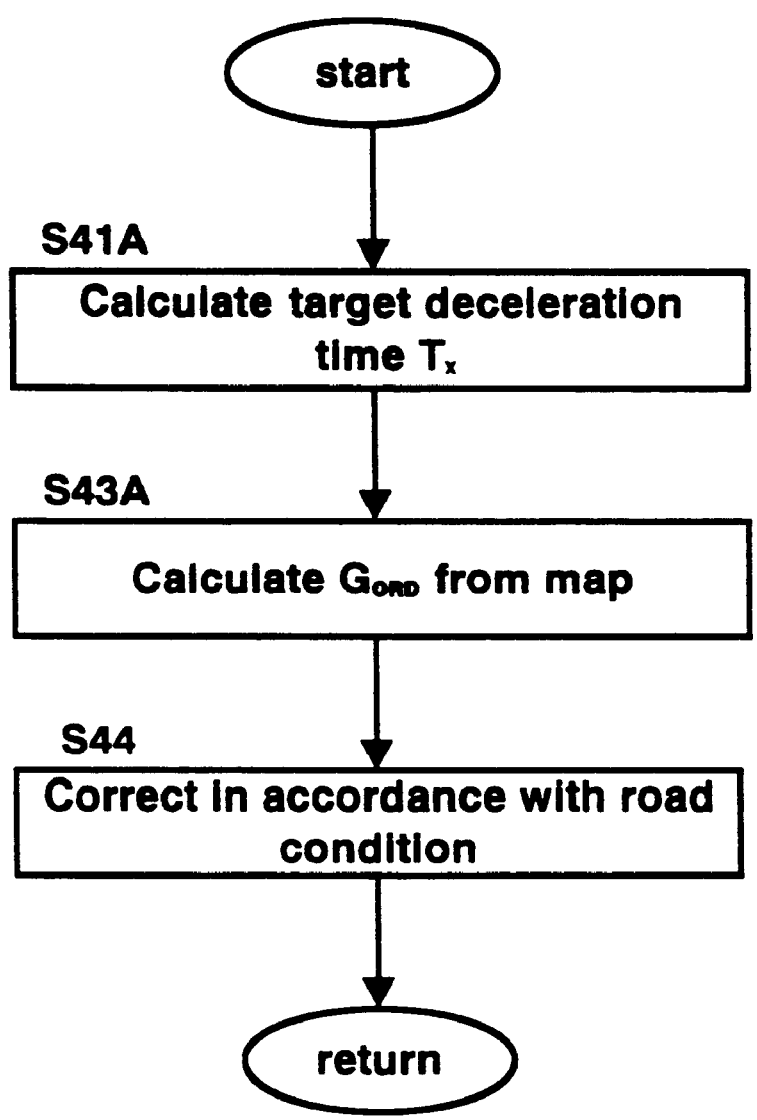
FIG. 13 is a flowchart of a subroutine representing still further example for calculating the required deceleration.
Figure 14:
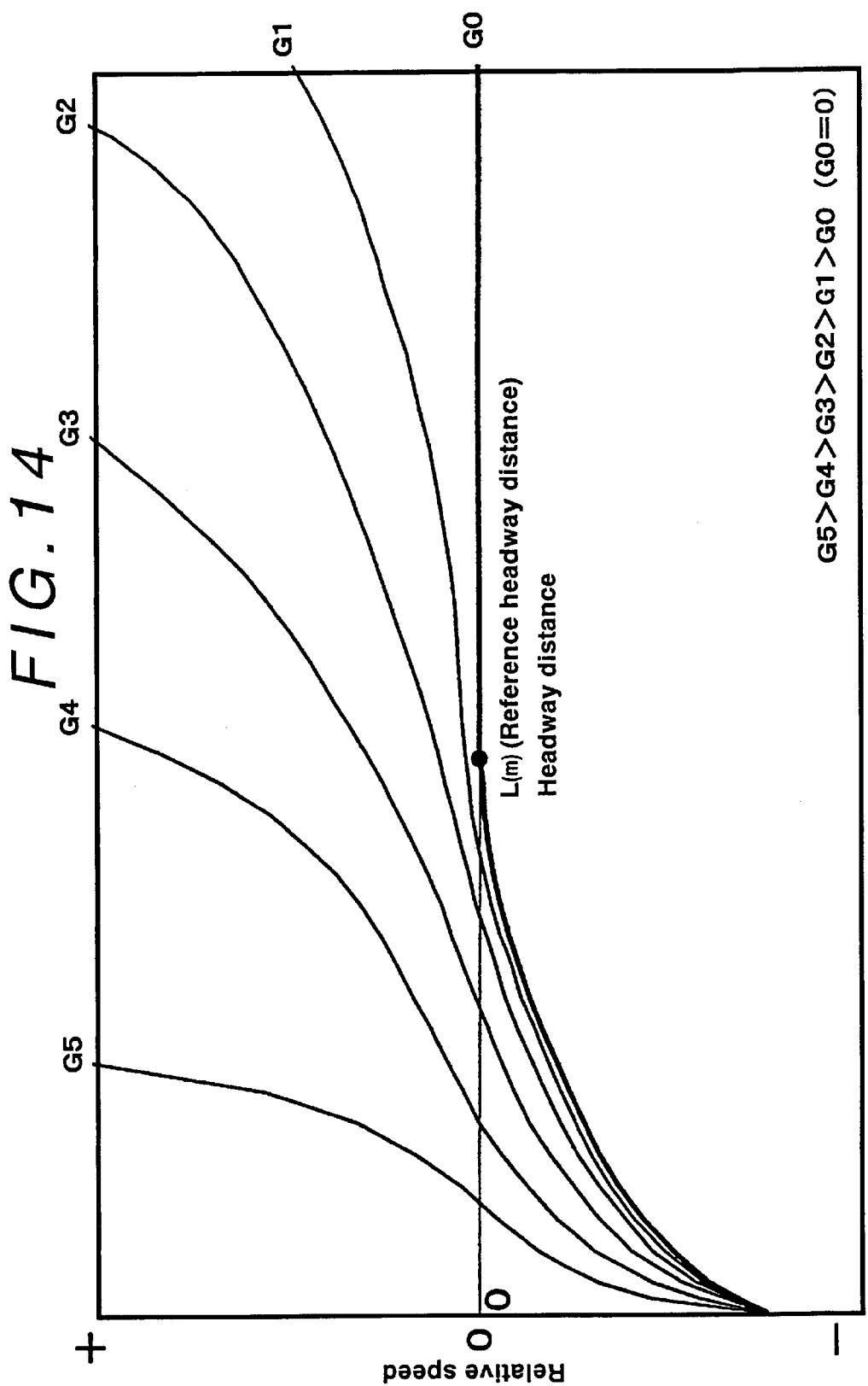
FIG. 14 is a graph conceptually representing the map of the required deceleration.

The required deceleration $G_{ORD}$ can be obtained in a way different from the one shown in FIG. 5. FIG. 13 shows the flow of the process of this embodiment. In step S41A of this embodiment, the target deceleration time Tx is calculated in the way similar to the previous one. Then in step S43A, the required deceleration $G_{ORD}$ is calculated by referring to the map shown in FIG. 14. This map is defined by the correlation between the headway distance and the relative speed such that each of the required decelerations G0 to G5 becomes greater as the relative speed is increased and as the headway distance is decreased. A plurality of maps are prepared in accordance with the headway distance such that the area where the deceleration becomes greater is broadened as the reference headway distance becomes longer. The subsequent steps of this embodiment are the same as those of the aforementioned embodiment.

Figure 15:
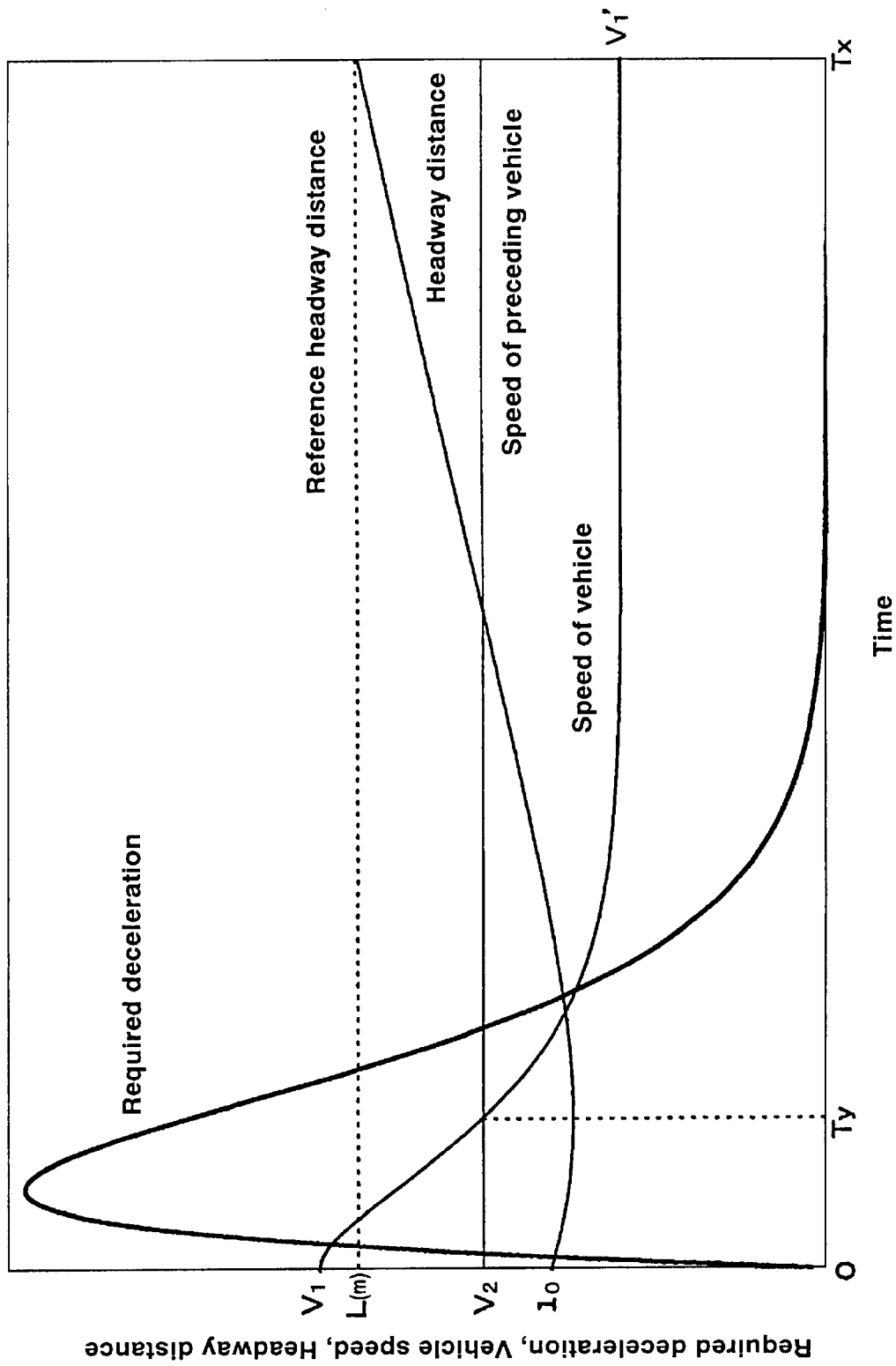
FIG. 15 is a timing chart of the vehicle sensitive cruise control that starts when the headway distance is shorter than the reference headway distance.
Figure 16:
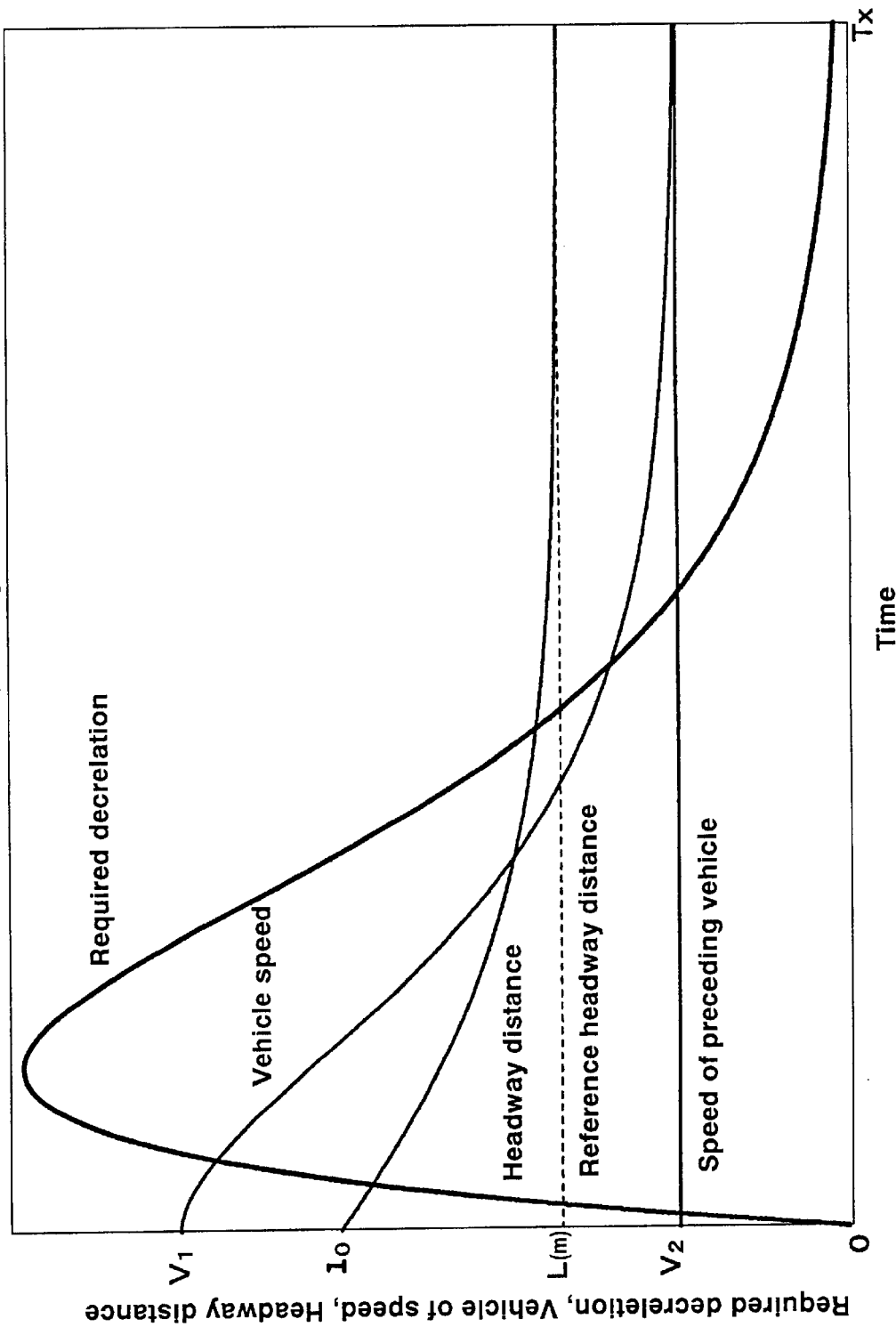
FIG. 16 is a timing chart of the vehicle sensitive cruise control that starts when the headway distance is longer than the reference headway distance.

FIGS. 15 and 16 are timing charts showing the respective changes in the required deceleration, vehicle speed and headway distance in response to the aforementioned control. FIG. 15 shows the state where the vehicle speed $V_1$ of the vehicle at the start of control is higher than the vehicle speed $V_2$ of the preceding vehicle, and the headway distance $l_0$ at the start of control is shorter than the reference headway distance L(m). In the aforementioned state, the driver may feel that the driver's vehicle is approaching the preceding vehicle too close, and the accelerator pedal is voluntarily released. In this case, the deceleration is set to reduce the vehicle speed sharply at the start of control, resulting in sharp decrease in the vehicle speed $V_1$. At a time point Ty immediately after the required deceleration has reached the peak, the vehicle speed $V_1$ has become already equivalent to the vehicle speed $V_2$ of the preceding vehicle. Thereafter, the required deceleration is executed rapidly followed by a continuous moderate deceleration. At the time Tx, the vehicle speed $V_1$ becomes $V_1'$ which is slightly less than the vehicle speed $V_2$ of the preceding vehicle, and the control routine is terminated. With the aforementioned characteristics, at the start of control, vehicle deceleration is performed sharply and, thereafter, further deceleration is moderately performed. The driver, thus, is able to rely on the control with a safe conscience.

FIG. 16 shows the state where the driver releases the accelerator pedal because the headway distance is rapidly reduced in the state where the vehicle speed $V_1$ of the vehicle at the start of control is higher than that of the preceding vehicle, and the headway distance $l_0$ at the start of control is longer than the reference headway distance L(m). In this case, at the start of control, as the required deceleration is set to reduce the vehicle speed at a relatively moderate rate, resulting in moderate deceleration in the vehicle speed $V_1$ of the vehicle. Finally the vehicle speed $V_1$ becomes equivalent to the vehicle speed $V_2$ of the preceding vehicle, the headway distance 1 becomes equivalent to the reference headway distance L(m), and the control is terminated. With the aforementioned characteristics, the vehicle speed is gradually decreased while gradually reducing the headway distance. As the headway distance is not broadened, the driver is not prompted to take a further action, for example, to operate the accelerator pedal, thus avoiding irritation of the driver.

The aforementioned embodiment is controlled to cause the headway distance $l_0$ at the start of control to approach the reference headway distance L(m). Accordingly, the vehicle speed is reduced based on the setting of the required deceleration that reflects the driver's intentions while keeping the driver in a safe condition. As a result, the driver is allowed to reduce the work load as well as move smoothly with the traffic flow.

While preferred embodiments of the invention have been described using specific terms, such description is for illustrative purposes only, and it is to be understood that changes and modifications can be made without departing from the spirit or scope of the following claims. The embodiments describe the control of the engine and automatic transmission. However, they can also be applied to the vehicle in which the motor generator is controlled, such as an electric vehicle or a hybrid vehicle. In such a case, a target deceleration torque is set based on the required deceleration sent from the required deceleration calculation means so as to control the motor generator.

What is claimed is:

1. A vehicle control unit for controlling a vehicle, the vehicle including a device capable of control deceleration and information detection means for providing information used in determining a correlation between the vehicle and a preceding vehicle, the vehicle control unit comprising:
   deceleration setting means for determining a correlation between the vehicle and the preceding vehicle based on information derived from the information detection means, comparing the correlation with a predetermined target correlation, and setting a deceleration of the vehicle so as to reach the target correlation; and
   deceleration control means for controlling the device that controls deceleration of the vehicle based on the set deceleration, the deceleration control occurring when an operator requires deceleration.

2. The vehicle control unit according to claim 1, wherein the deceleration setting means sets the deceleration that is continuously updated from the start of control to establishment of the target correlation and a value of the deceleration is reduced as it approaches the target correlation.

3. The vehicle control unit according to claim 2, wherein the deceleration is set to reduce a deceleration rate as it approaches the target correlation.

4. The vehicle control unit according to claim 2, wherein the information that permits determination of the correlation contains a headway distance between the vehicle and the preceding vehicle and a speed of the vehicle approaching the preceding vehicle;
   the target correlation contains a reference headway distance; and
   the deceleration is obtained by referring to a map at least based on an approaching speed of the vehicle so the approaching speed becomes zero or less at a time when reaching the reference headway distance.

5. The vehicle control unit according to claim 4, wherein the vehicle uses means for detecting a vehicle speed and means for detecting an operating speed of an accelerator pedal; and the reference headway distance is set in accordance with the speed of the vehicle and varied in accordance with the speed at which the accelerator pedal is released.

6. The vehicle control unit according to claim 4, wherein the vehicle uses means for detecting a vehicle speed and means for detecting an operating speed of an accelerator pedal; and the reference headway distance is set to the headway distance established at a time when the accelerator pedal is released and varied in accordance with the speed at which the accelerator pedal is released.

7. The vehicle control unit according to claim 2, wherein the information that allows determination of the correlation includes a headway distance between the vehicle and the preceding vehicle and a speed of the vehicle approaching the preceding vehicle;

the target correlation contains a reference headway distance; and the deceleration is calculated at least based on an approaching speed of the vehicle so the approaching speed becomes zero or less at a time when reaching the reference headway distance.

8. The vehicle control unit according to claim 7, wherein the vehicle uses means for detecting a vehicle speed and means for detecting an operating speed of an accelerator pedal; and the reference headway distance is set in accordance with the speed of the vehicle and varied in accordance with the speed at which the accelerator pedal is released.

9. The vehicle control unit according to claim 7, wherein the vehicle uses means for detecting a vehicle speed and means for detecting an operating speed of an accelerator pedal; and the reference headway distance is set to the headway distance established at a time when the accelerator pedal is released and varied in accordance with the speed at which the accelerator pedal is released.

10. The vehicle control unit according to claim 1, wherein the vehicle uses road condition detection means for detecting a road condition; and the deceleration is varied in accordance with the road condition detected by the road condition detection means.

11. The vehicle control unit according to claim 10, wherein the road condition detection means is a navigation system, information of which is used to determine the road condition.

12. The vehicle control unit according to claim 1, wherein the device capable of control of the deceleration is a continuously variable transmission, the deceleration is set to a target value of the continuously variable transmission, and a deceleration of the continuously variable transmission is controlled to reach the target value.

13. The vehicle control unit according to claim 1, wherein the operator requires deceleration occurs when a throttle opening reaches zero.

* * * * *